US010150210B2

(12) United States Patent
Rubens et al.

(10) Patent No.: US 10,150,210 B2
(45) Date of Patent: Dec. 11, 2018

(54) POWER HAND TOOL WITH IMPROVED OSCILLATING ECCENTRIC AND FORK MECHANISM

(71) Applicant: ROBERT BOSCH TOOL CORPORATION, Broadview, IL (US)

(72) Inventors: Jeremy Rubens, Palatine, IL (US); Jaime Moreno Terrazas, Imperial, CA (US)

(73) Assignees: Robert Bosch Tool Corporation, Farmington Hills, MI (US); Robert Bosch GmbH, Stuttgart (DE)

( * ) Notice: Subject to any disclaimer, the term of this patent is extended or adjusted under 35 U.S.C. 154(b) by 523 days.

(21) Appl. No.: 14/679,512

(22) Filed: Apr. 6, 2015

(65) Prior Publication Data

US 2015/0283691 A1    Oct. 8, 2015

Related U.S. Application Data

(60) Provisional application No. 61/975,029, filed on Apr. 4, 2014.

(51) Int. Cl.
| | |
|---|---|
| *B25F 5/00* | (2006.01) |
| *B23Q 5/027* | (2006.01) |
| *B24B 23/04* | (2006.01) |
| *B24B 47/16* | (2006.01) |

(52) U.S. Cl.
CPC ............ *B25F 5/00* (2013.01); *B23Q 5/027* (2013.01); *B24B 23/04* (2013.01); *B24B 47/16* (2013.01); *B25F 5/001* (2013.01)

(58) Field of Classification Search
CPC ... B25F 5/02; B25F 5/00; B24B 37/20; B23Q 5/027; B23Q 5/04
USPC ............... 173/29, 46, 50, 100, 110, 213
See application file for complete search history.

(56) References Cited

U.S. PATENT DOCUMENTS

| | | | | |
|---|---|---|---|---|
| 2,196,667 A | * | 4/1940 | Moseley | A61C 17/3436 15/22.1 |
| 3,337,952 A | * | 8/1967 | Rosen | B23D 49/006 30/277.4 |
| 3,592,067 A | * | 7/1971 | Hetzer | F15B 15/06 74/5 R |
| 3,806,980 A | * | 4/1974 | Belsito | A47L 17/00 15/22.1 |
| 4,282,879 A | * | 8/1981 | Kunii | A61B 8/4218 600/445 |
| 4,418,698 A | * | 12/1983 | Dory | A61B 8/4281 600/446 |
| 4,550,608 A | * | 11/1985 | Carnes | G01N 29/26 73/633 |
| 5,533,925 A | * | 7/1996 | Sato | B23Q 5/027 451/163 |

(Continued)

*Primary Examiner* — Robert Long
(74) *Attorney, Agent, or Firm* — Gerard Messina

(57) ABSTRACT

An oscillating power tool includes a drive motor producing rotary motion and an oscillating mechanism for converting the motor rotary motion to an oscillatory side-to-side movement. The oscillating mechanism includes a fork having two arms and coupled to an output spindle and includes a bearing positioned between the two arms of the fork and coupled to the drive motor. The arrangement of the fork and the bearing isolate relative rotation and translation between the components of the tool while still imparting an oscillatory motion to the output spindle.

20 Claims, 11 Drawing Sheets

(56) References Cited

U.S. PATENT DOCUMENTS

| | | | | |
|---|---|---|---|---|
| 5,833,524 A * | 11/1998 | Satoh | B24B 55/105 | 285/184 |
| 6,357,336 B1 * | 3/2002 | Wittmann | F16C 19/54 | 74/60 |
| 8,109,809 B2 * | 2/2012 | Bohne | B27B 19/006 | 451/344 |
| 8,695,725 B2 * | 4/2014 | Lau | B25F 3/00 | 173/170 |
| 8,925,931 B2 * | 1/2015 | Sergyeyenko | B24B 23/04 | 279/141 |
| 9,061,410 B2 * | 6/2015 | Zhou | B25F 5/00 | |
| 9,689,479 B2 * | 6/2017 | Seebauer | F16H 25/16 | |
| 2005/0126803 A1 * | 6/2005 | Zaiser | B23Q 5/027 | 173/216 |
| 2007/0084616 A1 * | 4/2007 | Lam | B25F 5/02 | 173/217 |
| 2011/0036609 A1 * | 2/2011 | Blickle | B24B 23/028 | 173/213 |
| 2011/0209888 A1 * | 9/2011 | Elsworthy | B23B 31/1071 | 173/217 |
| 2011/0266758 A1 * | 11/2011 | Sergyeyenko | B24B 23/04 | 279/106 |
| 2012/0086177 A1 * | 4/2012 | Zhou | B25F 5/00 | 279/140 |
| 2013/0181414 A1 * | 7/2013 | Haman | B27B 19/006 | 279/144 |
| 2014/0144662 A1 * | 5/2014 | Zhou | B23Q 3/14 | 173/213 |
| 2014/0182872 A1 * | 7/2014 | Rubens | B27B 19/006 | 173/213 |
| 2014/0190715 A1 * | 7/2014 | Wong | B25B 21/00 | 173/39 |
| 2014/0318286 A1 * | 10/2014 | Seebauer | F16H 25/16 | 74/55 |
| 2015/0034353 A1 * | 2/2015 | Huo | H02K 7/075 | 173/217 |
| 2015/0069724 A1 * | 3/2015 | Wierzchon | B25F 3/00 | 279/144 |
| 2015/0075830 A1 * | 3/2015 | Zhang | B24B 23/04 | 173/213 |
| 2015/0135541 A1 * | 5/2015 | Wierzchon | B27B 19/006 | 30/276 |
| 2015/0143706 A1 * | 5/2015 | Bek | B23D 51/16 | 30/393 |
| 2016/0271711 A1 * | 9/2016 | Qian | B27B 19/006 | |
| 2016/0290453 A1 * | 10/2016 | Rubens | B27B 19/006 | |

* cited by examiner

POWER HAND TOOL WITH IMPROVED OSCILLATING ECCENTRIC AND FORK MECHANISM

CROSS-REFERENCE TO RELATED APPLICATIONS

The patent application claims priority from U.S. provisional patent application Ser. No. 61/975,029, filed on Apr. 4, 2014 and entitled "Power Hand Tool with Improved Oscillating Eccentric and Fork Mechanism", and hereby incorporates by reference the contents of this patent application for all purposes in its entirety.

BACKGROUND

This disclosure relates to the field of power tools, and more particularly to handheld power tools having an oscillating tool or blade attachments.

Oscillating power tools can be lightweight, handheld tools configured to oscillate various accessory tools and attachments, such as cutting blades, sanding discs, grinding tools, and many others. The accessory tools and attachments can enable the oscillating power tool to shape and contour workpieces in many different ways.

FIGS. 1-5 illustrate a conventional oscillating power tool 10 having a generally cylindrically shaped housing 12 and a tool head 14 located at a front end of the housing 12. As shown in FIG. 1, the housing 12 includes a handle portion 16 formed to provide a gripping area for an operator. The housing 12 is further configured to carry a power supply and a motor M that drives an eccentric motor shaft 18 which engages a spherical drive bearing 20. The housing 12 can be constructed of a rigid material such as plastic, metal, or a composite material such as a fiber reinforced polymer.

Turning now to FIG. 2, the eccentric motor shaft 18 includes an eccentric pin 19 and the spherical drive bearing 20 includes ball bearings 21 positioned around the eccentric pin 19 and contained within an outer race 23. As the eccentric motor shaft 18 rotates, the eccentric pin 19 moves in a circular path or orbit about a longitudinal axis S of the shaft 18. The ball bearings 21 translate this rotational motion to the outer race 23 and the outer race 23 moves in the same circular path about the longitudinal axis S.

Returning now to FIG. 1, the tool head 14 is configured to support an output spindle 22 having a tool accepting portion 24 configured to accept a number of different tools or tool accessories, such as, for example, scraping tools or cutting blades. The output spindle 22 also includes a yoke or fork 26 spaced apart from the tool accepting portion 24 and having two arms 28 positioned on opposite sides of the spherical drive bearing 20. The fork 26 is configured to rotate about an axis A that is generally perpendicular to the longitudinal axis S of the motor shaft 18 by cyclic angular displacement of the fork about the axis A.

More specifically, as shown in FIG. 3, the eccentric motor shaft 18 is operated by the motor M (shown in FIG. 1) to translate the spherical drive bearing 20 in a circular path in a plane $P_1$ which is arranged orthogonally to the longitudinal axis S of the eccentric motor shaft 18. As shown in FIG. 4, the travel of the spherical drive bearing 20 in the circular path or orbit periodically brings an outside surface 34 of the outer race 23 of the spherical drive bearing 20 into contact with an inside surface 36 of each of the arms 28 of the fork 26. A schematic drawing of the spherical drive bearing 20 in two positions superimposed onto one another is shown in FIG. 4 to illustrate contact of the outside surface 34 of the outer race 23 with the inside surface 36 of each of the arms 28. As a result of the contact with the spherical drive bearing 20, the fork 26 rotates about the axis A in an arced path 30 shown in FIG. 4 and FIG. 5. This arced path is contained within a lateral plane $P_2$ shown in FIG. 3. Turning now to FIG. 5, the movement of the fork 26 in the arced path 30, is translated through the output spindle 22 to the tool or tool accessory coupled to the oscillating power tool 10.

The spherical shape of the spherical drive bearing 20 enables the fork 26 to move in this arced path 30 without interfering with the circular path of the spherical drive bearing 20 and enables the outside surface 34 of the outer race 23 of the spherical drive bearing 20 to slide and roll along the inside surfaces 36 of the arms 28. Additionally, the shapes of the spherical drive bearing 20 and the fork 26 translate the circular movement of the spherical drive bearing 20 in plane $P_1$ into lateral movement of the fork 26 in plane $P_2$ because the spherical drive bearing 20 does not engage the arms 28 of the fork 26 when moving upwardly and downwardly in the plane $P_1$.

This conventional design results in wear and damage to the components of the oscillating power tool 10 and thereby reduced life of the tool. A number of issues arise due to the interaction of the components at the interfaces where the spherical drive bearing 20 contacts the arms 28 of the fork 26. Because the spherical outside surface 34 of the spherical drive bearing 20 is contacting planar inside surfaces 36 of the arms 28, the surface areas of the contact are concentrated to a single point on the inside surface 36 of each arm 28, which generates excessive heat during use of the tool 10. Additionally, enabling rotational movement of the spherical drive bearing 20 while the fork 26 maintains its rotational position results in sliding of the outer race 23 of the spherical drive bearing 20 at these interfaces between the outside surface 34 of the outer race 23 and the inside surfaces 36 of the arms 28. This sliding creates heat and wear on the surfaces 34, 36 of the interface which reduces the life of the parts of the tool 10.

Additionally, movement of the spherical drive bearing 20 in plane $P_1$ relative to motion of the fork 26 in plane $P_2$ results in upward and downward sliding of the spherical drive bearing 20 at these interfaces between the outside surface 34 of the outer race 23 and the inside surfaces 36 of the arms 28. While in theory the spherical drive bearing 20 would roll along the interface when in contact with the arms 28, in physical testing it is observed that the spherical drive bearing 20 intermittently contacts the arms 28 of the fork 26 and constantly changes direction of rolling, resulting in sliding. This upward and downward sliding generates heat and wear on the surfaces 34, 36 of the interface which contributes to the damage of the spherical drive bearing 20 and reduces the life of the tool 10. Furthermore, because the fork 26 is moving in the arced path 30, the movement of the fork 26 includes a lateral component as well as an axial component. The axial component of the movement of the fork 26 generates a moment in the spherical drive bearing 20 that introduces a load on the spherical drive bearing 20 in the direction of the longitudinal axis L.

Finally, with this conventional configuration, there must be some clearance between the arms 28 of the fork 26 and the spherical drive bearing 20 to enable the fork 26 to move only in the plane $P_2$ and to ensure that the spherical drive bearing 20 does not engage the arms 28 of the fork 26 when moving upwardly and downwardly in the plane $P_1$. This clearance results in impacting and banging of the fork 26 with the spherical drive bearing 20 which contributes to the load on the spherical drive bearing 20.

Accordingly, it can be seen that the conventional oscillating mechanism can have a deleterious impact on the life of the spherical drive bearing 20. The sources of this weakness include: a) the point of contact between the spherical drive bearing 20 and the arms 28 of the fork 26; b) the sliding of the outer race 23 of the spherical drive bearing 20 due to the relative rotation between the spherical drive bearing 20 and the fork 26; c) upward and downward sliding of the spherical drive bearing 20; and d) banging or impacting of the spherical drive bearing 20 due to necessary looseness of the interface.

Robustness, or more accurately, lack of robustness limits the size of the tool attachment and the operating conditions of the conventional oscillating power tool 10, which can ultimately limit performance. A larger tool attachment increases the load on the spherical drive bearing 20. An increase in the operating speed also increases the bearing load. This increased load forces limits to be placed on the size of the tool and on the operating speed of the tool. Consequently, there is a need for an oscillating mechanism that overcomes these problems and allows for higher "power" and performance operation of an oscillating tool.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure include those related to an apparatus that comprises a power tool that includes a motor, an oscillating eccentric mechanism that includes a drive shaft that is operatively connected to the motor wherein the oscillating eccentric mechanism is configured to rotate in a first direction, and a fork mechanism comprising arms that is configured to rotate in a second direction that is oblique to the first direction in a plane of desired oscillation. The arms may define a fork angle in the plane of desired oscillation, wherein the oscillating eccentric mechanism is operatively associated with the fork mechanism for providing rotation thereto. The oscillating eccentric mechanism may comprise an eccentric pin that is angled to match the angle of the fork and that is configured to match that angle as the fork rotates.

Certain embodiments of the present disclosure also include the following apparatus. A power tool is provided that includes a motor, an oscillating eccentric mechanism that includes a drive shaft wherein the oscillating eccentric mechanism is configured to rotate in a first direction, and a fork mechanism comprising arms that is configured to rotate in a second direction that is oblique to the first direction. The power tool may also include an output spindle that is operatively associated with the fork mechanism for receiving rotational movement from the fork mechanism, wherein said operative association between the fork mechanism and the output spindle is configured to allow rotation of the fork mechanism in a third direction that is oblique to the first direction and that is oblique to the second direction.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION OF SPECIFIC EMBODIMENTS

Figure 1:
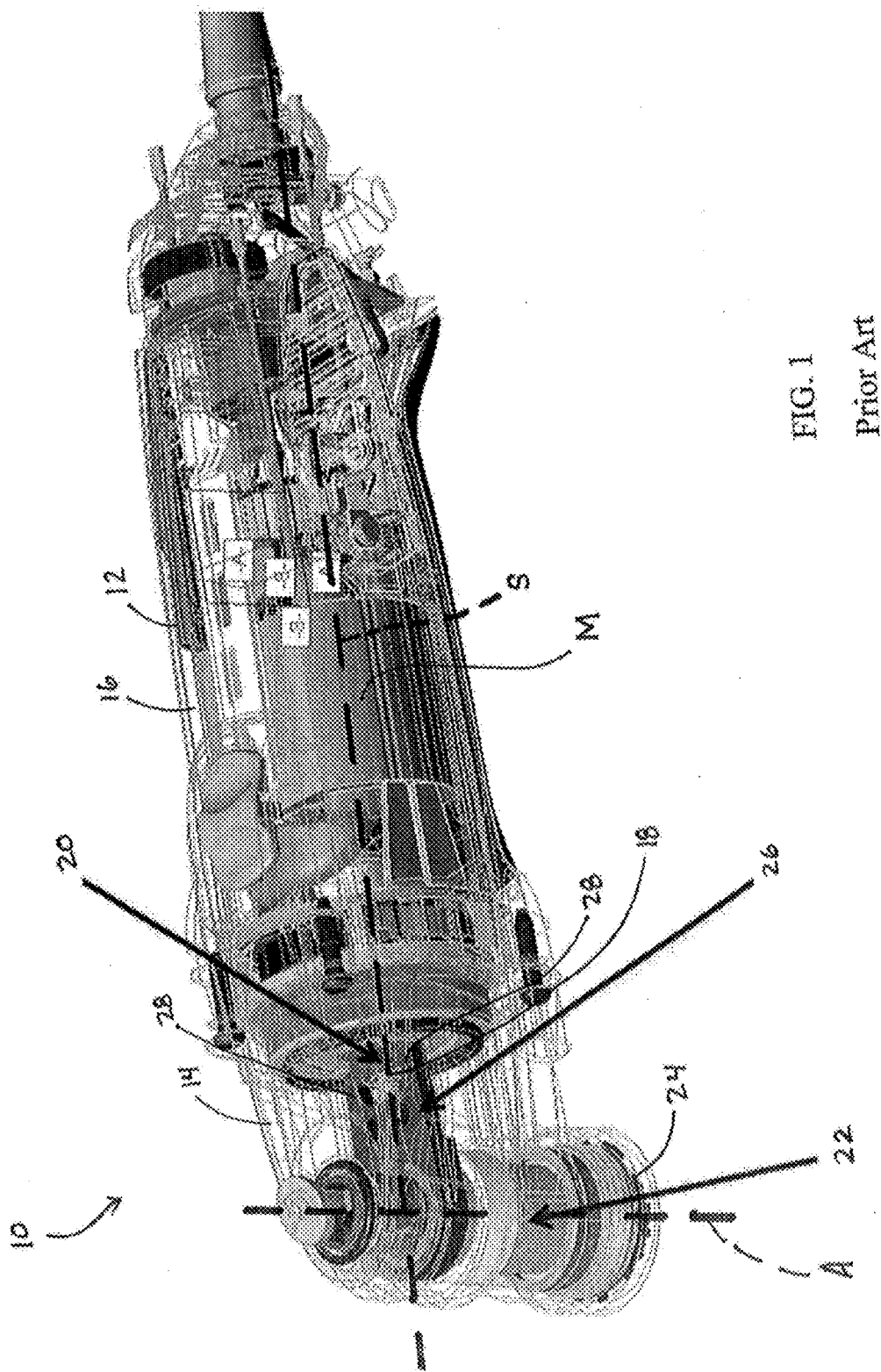
FIG. 1 is a perspective view of a conventional oscillating power tool including an eccentric motor shaft and an output spindle.
Figure 2:
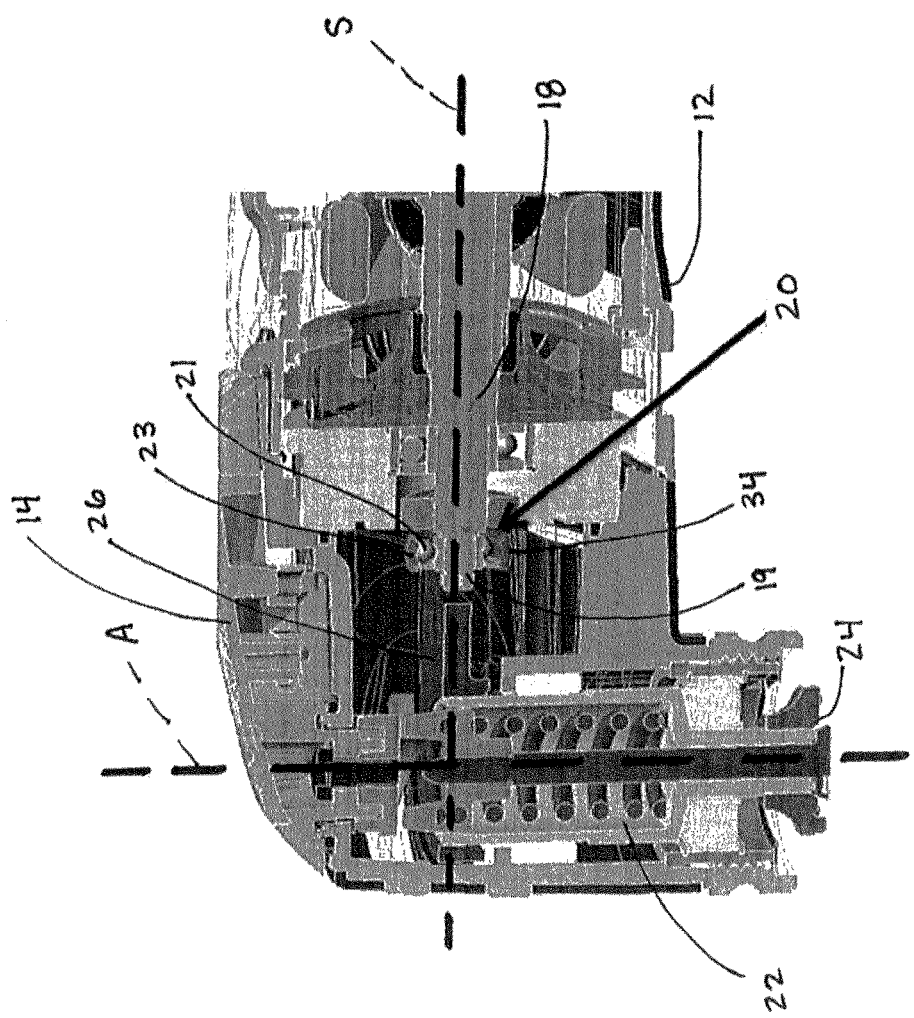
FIG. 2 is a side cross-sectional view of a portion of the conventional oscillating power tool of FIG. 1.
Figure 3:
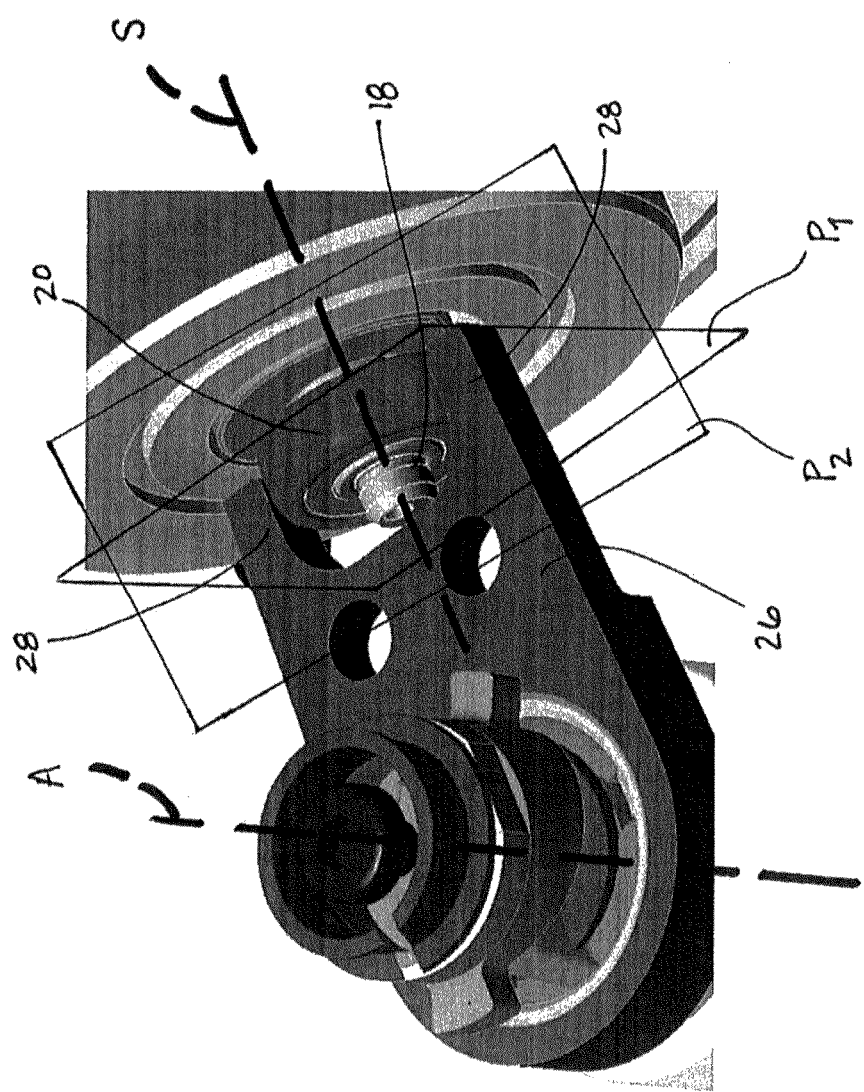
FIG. 3 is a top perspective view of a portion of the conventional oscillating power tool of FIG. 1.
Figure 4:
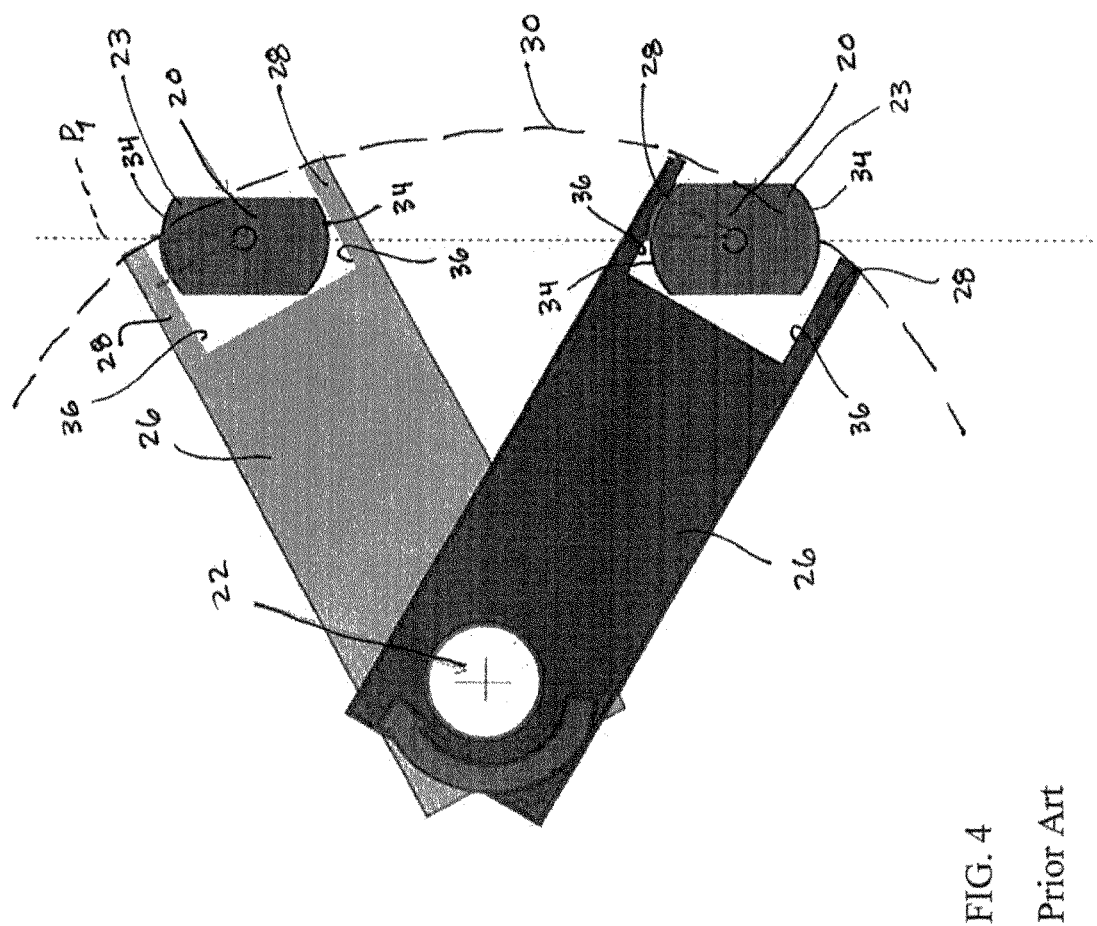
FIG. 4 is schematic drawing of the fork and the bearing of FIG. 1.
Figure 5:
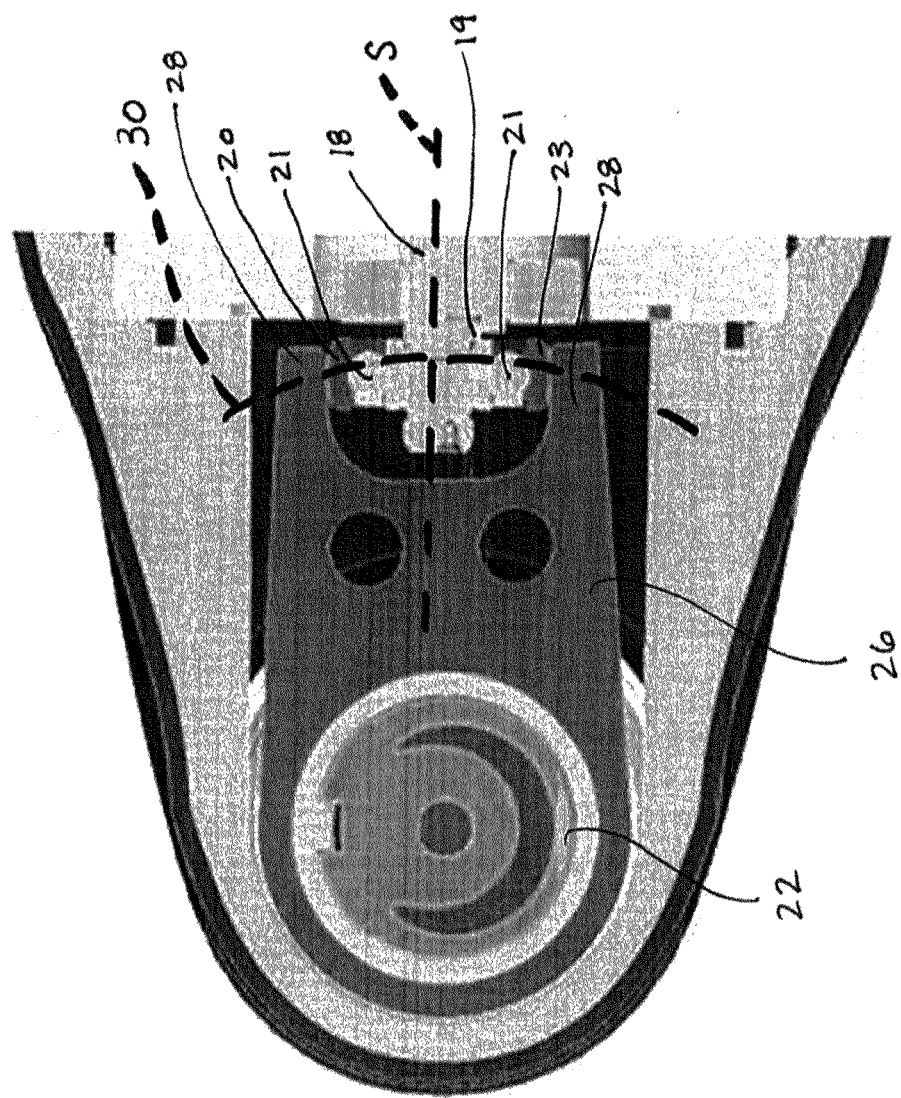
FIG. 5 is a top cross-sectional view of a portion of the conventional oscillating power tool of FIG. 1.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such development effort might be complex and time consuming, but would nevertheless be a routine undertaking of design, fabrication, and manufacture for those of ordinary skill having the benefit of this disclosure.

This disclosure relates to an improved oscillating eccentric and fork mechanism configured to be used in an oscillating power tool. The improved oscillating eccentric and fork mechanism is configuredto allow for higher performance operation of the oscillating power tool. In one embodiment, the eccentric pin in the oscillating eccentric is angled to match the angle of the fork to reduce impact and sliding between the oscillating eccentric and the fork. In another embodiment, the fork is configured to pivot relative to the output spindle to reduce impact between the oscillating eccentric and the fork. In another embodiment, the eccentric pin in the oscillating eccentric is angled to match the angle of the fork, the fork is free to move relative to the oscillating eccentric, and the fork is configured to pivot relative to the output spindle to reduce impact between the oscillating eccentric and the fork. In another embodiment, the eccentric pin in the oscillating eccentric is angled to match the angle of the fork, the fork is fixedly coupled to the oscillating eccentric, and the fork is configured to pivot relative to the output spindle to remove impact and sliding between the oscillating eccentric and the fork.

The embodiments disclosed and described herein can be used with an oscillating power tool like the oscillating power tool 10 described above and shown in FIGS. 1-5. Accordingly, features that are substantially similar to those described above will not be described again here and will be referred to using the same reference numerals.

Figure 6:
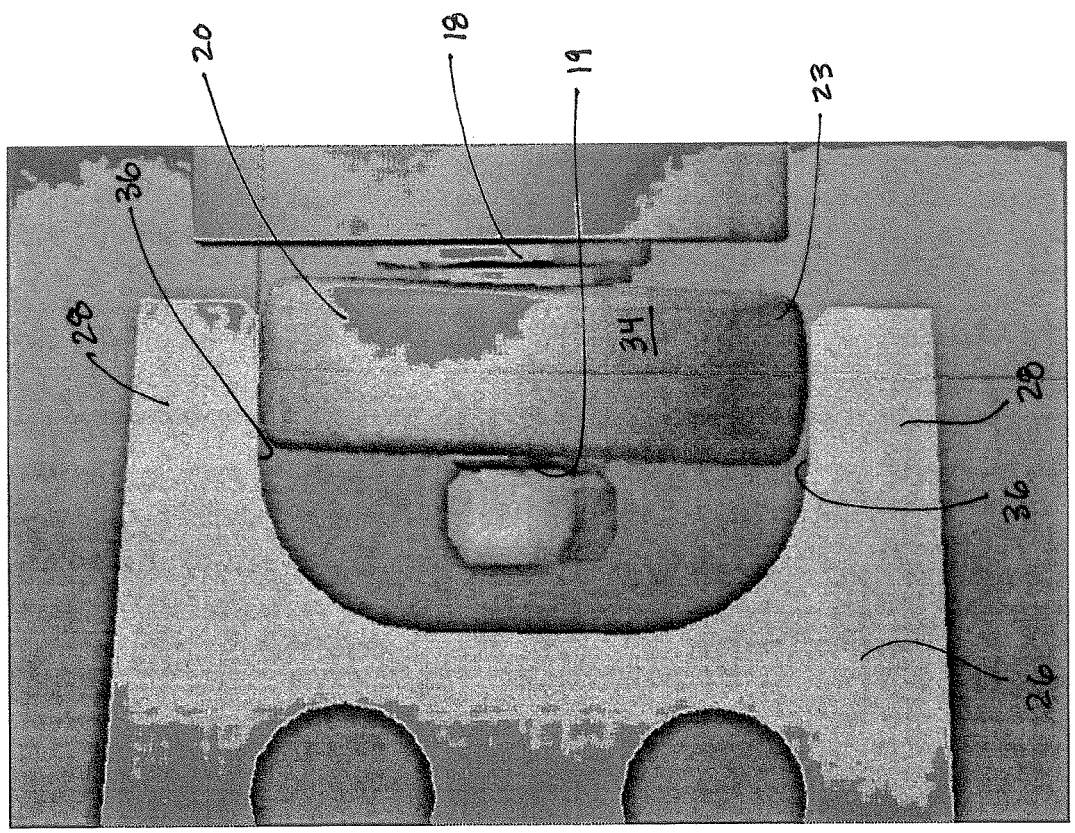
FIG. 6 is a top view of a fork and bearing which can be used in an oscillating power tool like that shown in FIG. 1.

As shown in FIG. 6, to improve the conventional oscillating power tool, the disclosure contemplates that the eccentric pin 19 of the eccentric motor shaft 18 is angled to the same angle as the fork 26. By angling the eccentric pin 19 in this manner, the interface between the fork 26 and the bearing 20 is aligned such that as the eccentric pin 19 rotates, the outside surface 34 of the outer race 23 of the bearing 20 is consistently parallel to the inside surfaces 36 of the arms 28. It is contemplated that any method of attaching the eccentric pin that allows it to be configured to match the angle of the fork as it rotates could be used and is within the scope of the present disclosure. A specific example of how this may be achieved will be discussed later herein. As a result of this alignment, when the outside surface 34 of the outer race 23 contacts the inside surfaces 36 of the arms 28, the bearing 20 and the fork 26 move together in the same direction, in contrast to the prior art movement shown in FIG. 4. Since the fork 26 moves with the bearing 20, the amount of relative sliding occurring between the outside surface 34 of the outer race 23 and the inside surfaces 36 of the arms 28 is reduced, which reduces the amount of wear and damage to the bearing 20.

Additionally, because the fork 26 moves with the bearing 20, the bearing 20 does not need to be a spherical bearing. As the outside surface 34 of the outer race 23 no longer rolls at an angle along the inside surfaces 36 of the arms 28 but instead contacts the inside surfaces 36 in a parallel manner, a standard, cylindrical bearing can be used for the bearing 20 as depicted in FIG. 6. One benefit of using a standard, cylindrical bearing is a reduction in cost of the device by substituting a simpler part. Another benefit of replacing the spherical bearing with a standard, cylindrical bearing is an increase in the contact area between the outside surface 34 of the outer race 23 and the inside surfaces 36 of the arms 28. Because the outside surface 34 of the outer race 23 is cylindrically shaped instead of spherically shaped, the contact area between the outside surface 34 of the outer race 23 and the inside surfaces 36 of the arms 28 becomes a line of contact rather than a point of contact. Accordingly, this arrangement reduces wear and damage to the bearing 20 by increasing contact areas between the fork 26 and the bearing 20 and by reducing sliding of the outside surface 34 of the outer race 23 on the inside surfaces 36 of the arms 28 of the fork 26. Obviously, it can be said that the cylindrical bearing is operatively connected to the eccentric pin as it surrounds the pin such that movement of the pin is imparted to the bearing.

It should be noted that any embodiment discussed herein may include an oscillating eccentric mechanism that is configured to rotate in a first direction and a fork mechanism that comprises a fork member that includes arms that is configured to rotate in a second direction that is different than the first direction. In most cases, these directions are perpendicular to each other but it is contemplated that they could form any angle that is oblique as adjustability of the head to which the tool or implement is attached may be useful for different applications of a power tool and is therefore within the scope of the present disclosure.

Figure 7:
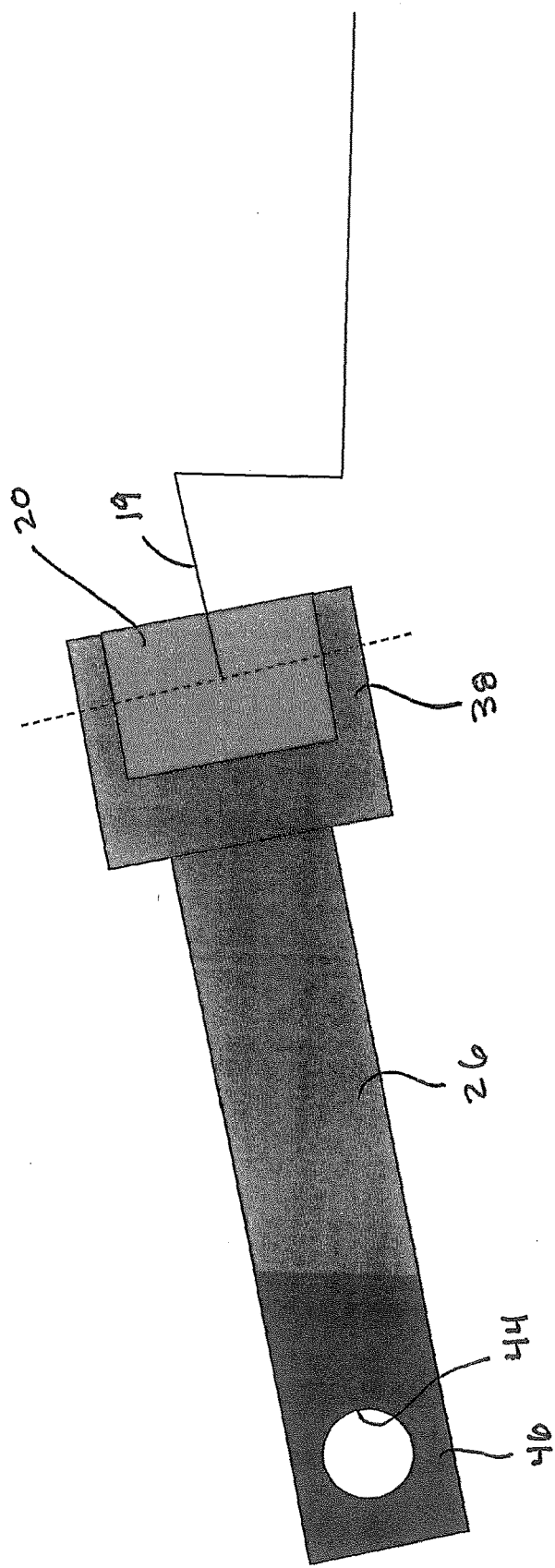
FIG. 7 is a schematic drawing of a side cross-sectional view of a fork and a bearing which can be used in an oscillating power tool like that shown in FIG. 1.
Figure 8:
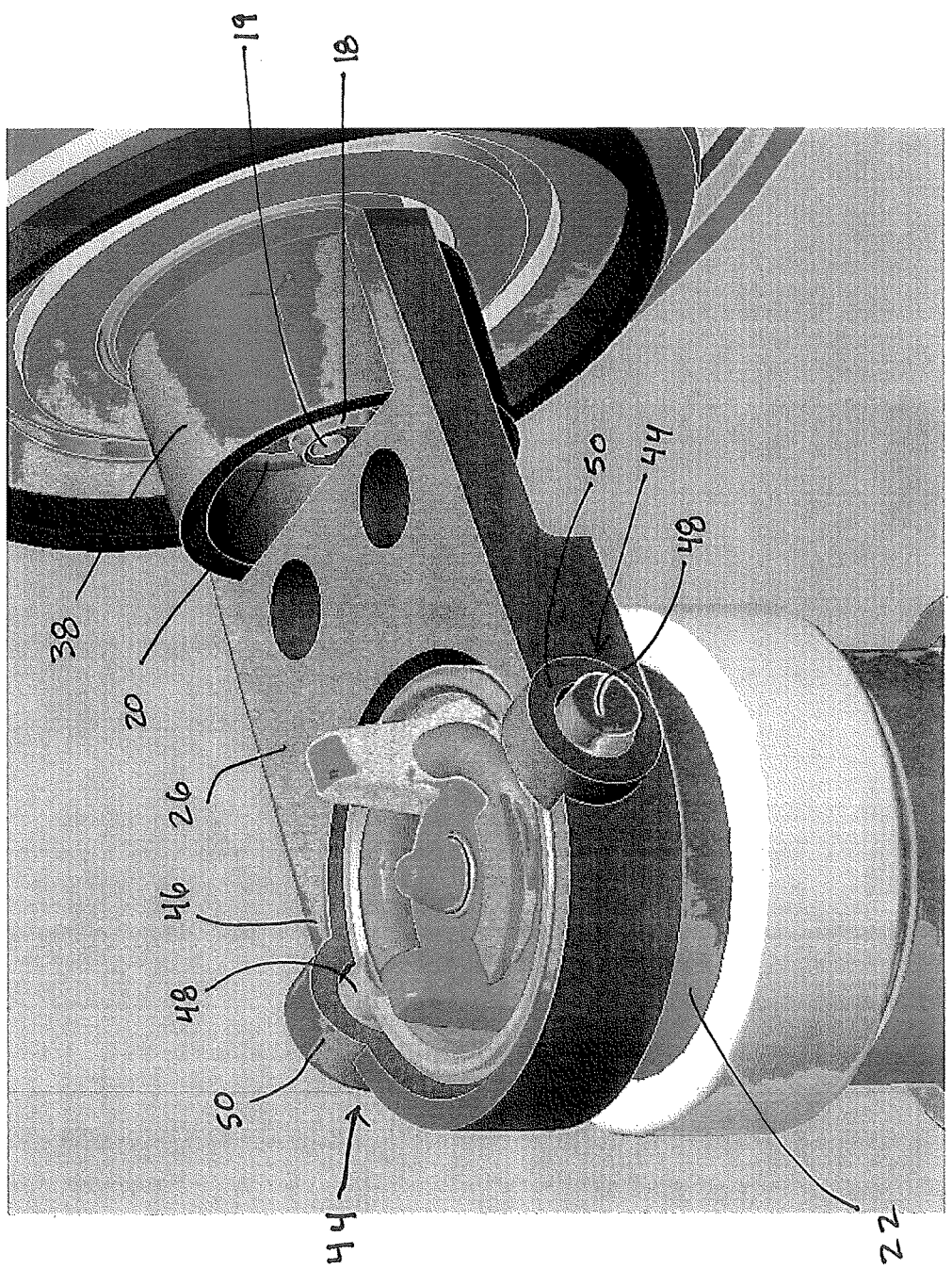
FIG. 8 is a perspective view of the fork and bearing shown in FIG. 7.

Turning now to FIG. 7 and FIG. 8, another embodiment of the fork 26 and the eccentric pin 19 is shown. In this embodiment, the fork 26 includes a hollow cylinder 38 and the bearing 20 is formed as a complementary cylinder which is pressed into the hollow cylinder 38 of the fork 26 such that the bearing 20 and the fork 26 are fixed to one another and move as a single unit. In this embodiment, the eccentric pin 19 is angled to the same angle as the fork 26, and the fork 26 includes a pivot 44 formed at a spindle end 46 of the fork 26 which engages the output spindle 22 (shown in FIG. 1) and is arranged opposite the arms 28 (shown in FIG. 3).

As shown in FIG. 8, the pivot 44 is configured to enable the fork 26 to move upwardly and downwardly relative to the output spindle 22 but also to translate movement in the back and forth direction into the output spindle 22. To accommodate the movement of the fork 26 relative to the output spindle 22, there is some clearance between the output spindle 22 and the fork 26. In particular, the pivot 44 may be formed as two axles 48 protruding outwardly from opposite sides of the output spindle 22 and two receiving members 50 formed in the spindle end 46 of the fork and configured to receive the axles 48 therein. The receiving members 50 allow the fork 26 to pivot in a vertical plane about the axles 48 when the fork 26 moves in upwardly and downwardly directions and still allow the fork 26 to move the output spindle 22 when the fork 26 moves in side to side directions. Because the interface between the fork 26 and the bearing 20 is now fixed at the hollow cylinder 38, the circular movement is now translated to linear movement at the interface between the fork 26 and the output spindle 22 rather than the interface between the fork 26 and the bearing 20.

Accordingly, this arrangement eliminates wear and damage to the bearing 20 caused by the small point of contact between the spherical drive bearing 20 and the arms 28 of the fork 26, wear and damage caused by sliding of the outside surface 34 of the outer race 23 due to the relative rotation between the spherical drive bearing 20 and the fork 26, wear and damage caused by upward and downward sliding of the outside surface 34 of the outer race 23 on the inside surfaces 36 of the arms 28 of the fork 26, and wear and damage caused by banging or impacting between the fork 26 and the bearing 20 due to necessary looseness of the interface. In alternative embodiments, other types of interfaces between the fork 26 and the output spindle 22 can be used to enable the fork 26 to move upwardly and downwardly relative to the output spindle 22 but also to translate movement in the back and forth direction into the output spindle 22.

As mentioned previously, the directions that the oscillating eccentric mechanism and the fork mechanism rotate are oblique to each other and are sometimes perpendicular to each other. Similarly, in some embodiments the output spindle is operatively associated with the fork mechanism for receiving rotational movement from the fork mechanism, wherein said operative association between the fork mechanism and the output spindle is configured to allow rotation of the fork mechanism in a third direction that is oblique to the first direction and that is also oblique to the second direction. In some cases, these angles are all perpendicular to each other but may not be depending on the application.

In another variation, the cylindrical hollow structure of the fork or fork member could have any hollow tubular structure. It may be desirable to vary the profile of this structure to provide unique camming characteristics that alters the movement of the output spindle in some desired manner. For the examples shown herein, the operative association between the fork mechanism and the output spindle includes a pivot connection that includes two axle members that protrude in diametrically opposite directions from the spindle but it is contemplated that only one axle member may be used in some embodiments. Likewise, one or more receiving members may be positioned on the fork member that is configured to receive one or more axles of the output spindle.

Figure 9:
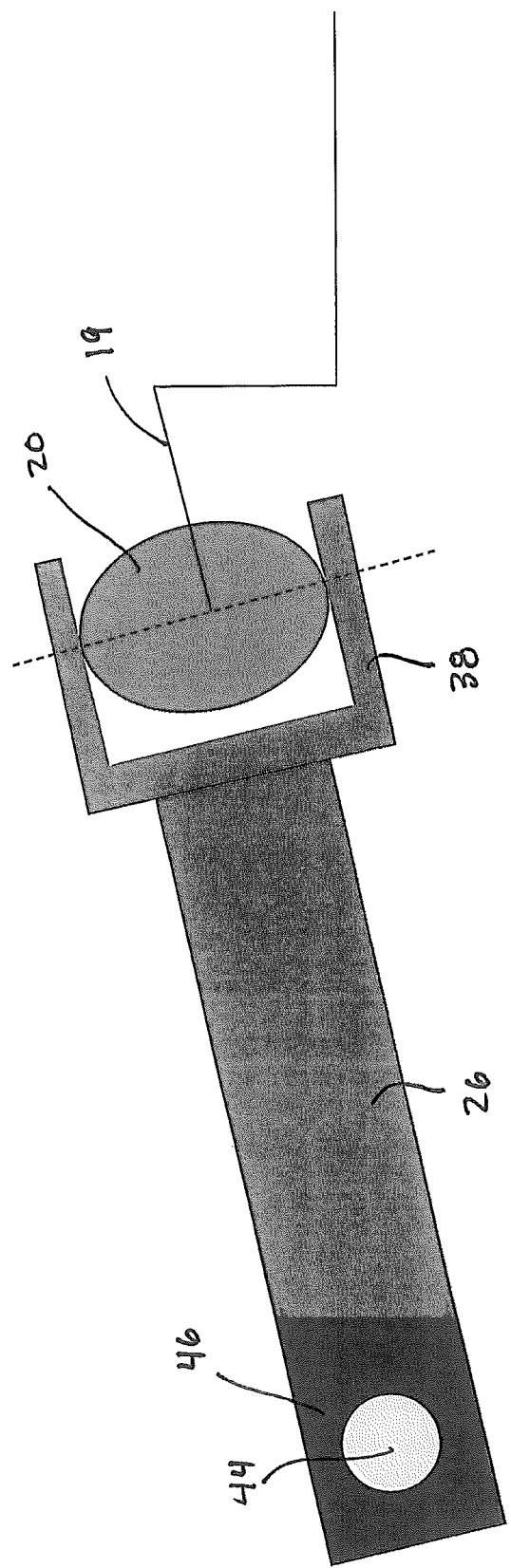
FIG. 9 is a schematic drawing of a side cross-sectional view of a fork and a bearing which can be used in an oscillating power tool like that shown in FIG. 1.

Turning now to FIG. 9, another embodiment of the fork 26 and the eccentric pin 19 is shown. In this embodiment, a spherical bearing is used for the bearing 20, the eccentric pin 19 is angled to the same angle as the fork 26, and the fork 26 includes a pivot 44 which engages the output spindle 22 (shown in FIG. 1). This embodiment is similar to that shown in FIG. 7 and FIG. 8 in that the fork 26 includes a hollow cylinder 38 and the bearing 20 positioned therein that is complimentary shaped to the hollow tubular structure. This embodiment differs from that shown in FIG. 7 and FIG. 8, however, in that the bearing 20 is a spherical bearing which moves freely within the hollow cylinder 38 of the fork 26 rather than a cylindrical bearing pressed into the hollow cylinder 38 of the fork 26. Accordingly, this embodiment reduces the alignment required between the fork 26 and the bearing 20 during assembly of the device.

In this embodiment, the outer race 23 of the bearing 20 ideally would not have any relative movement with respect to the fork 26. However, in practice, the alignment tolerance may introduce some motion in the interface between the bearing 20 and the fork 26. The interface of the spherical bearing 20 with the inside surface of the cylinder allows some misalignment to be compensated for by the sphere that is free to rotate inside the cylinder. This arrangement eliminates wear and damage to the bearing 20 caused by the small point of contact between the spherical drive bearing 20 and the arms 28 of the fork 26, wear and damage caused by sliding of the outside surface 34 of the outer race 23 due to the relative rotation between the spherical drive bearing 20 and the fork 26, wear and damage caused by upward and downward sliding of the outside surface 34 of the outer race 23 on the inside surfaces 36 of the arms 28 of the fork 26, and wear and damage caused by banging or impacting between the fork 26 and the bearing 20 due to necessary looseness of the interface.

In some embodiments such as that shown by FIG. 9, the eccentric pin 19 is angled from the distal end of the motor shaft. The angle of the eccentric pin, which is typically the cylindrical axis of the pin, is angled to the same angle as the fork 26 (explained in further detail with respect to FIGS. 11-13), aligning the bearing with the arms of the fork and reducing the sliding, impact between the components. This, in turn, reduces the wear and damage between the bearing and the fork while increasing the contact area between the bearing and the fork.

Figure 10:
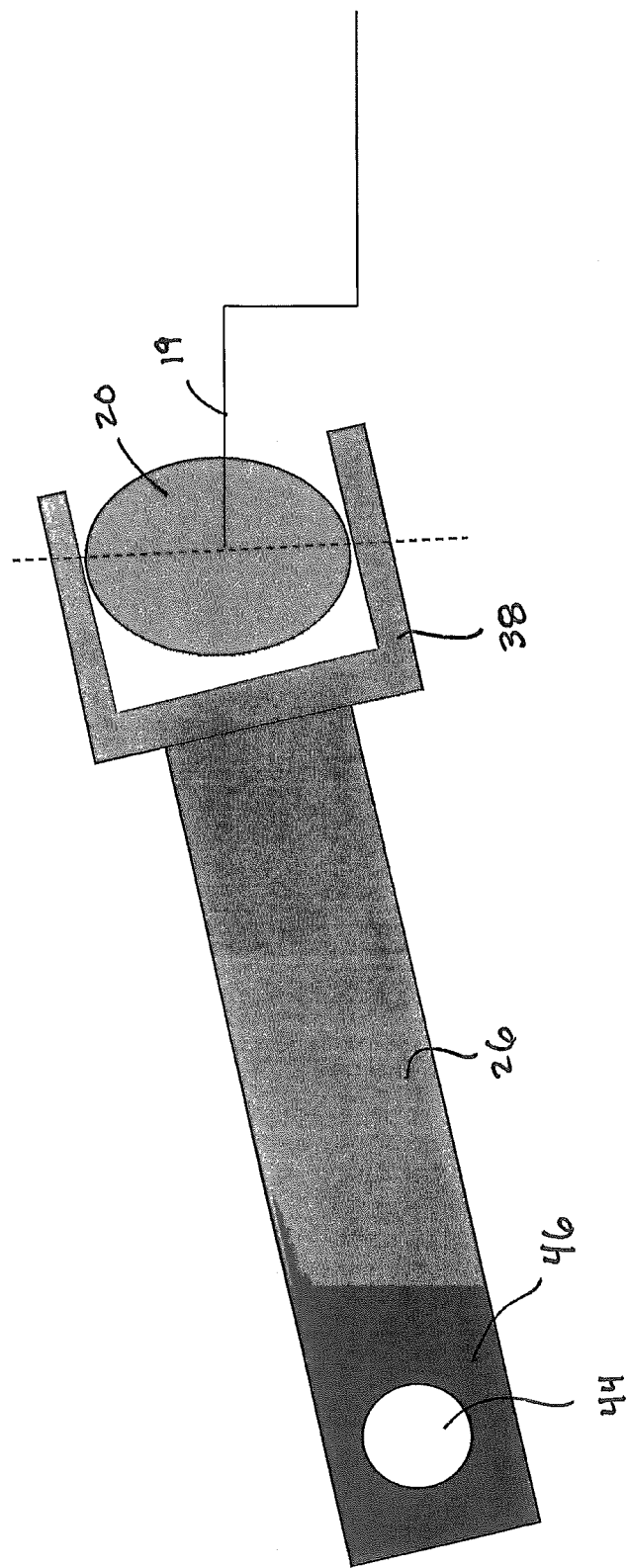
FIG. 10 is a schematic drawing of a side cross-sectional view of a fork and a bearing which can be used in an oscillating power tool like that shown in FIG. 1.

Turning now to FIG. 10, another embodiment of the fork 26 and the eccentric pin 19 is shown. In this embodiment, a spherical bearing is used for the bearing 20, the eccentric pin 19 is not angled to the same angle as the fork 26, that is to say that the eccentric pin is and remains parallel to the axis of rotation of the oscillating eccentric mechanism, and the fork 26 includes a pivot 44 which engages the output spindle 22 (shown in FIG. 1). This embodiment is similar to that shown in FIG. 9 in that the fork 26 includes a hollow cylinder 38 and a spherical bearing 20 positioned therein. This embodiment differs from that shown in FIG. 9, however, in that the eccentric pin 19 is not angled to the same angle as the fork 26 and, accordingly, the bearing 20 is also not angled to the same angle as the fork 26. As a result, this embodiment requires the pivot 44 which compensates for the rotational fixation between the bearing 20 and the fork 26 by allowing the fork 26 to move upwardly and downwardly relative to the output spindle 22. Accordingly, this embodiment eliminates the upward and downward sliding between the bearing 20 and the fork 26, which may be the largest contributor of heat and wear to the tool 10.

According to the present disclosure, an oscillating mechanism is provided for a power tool having a working tool or blade that is driven for oscillating movement. In one aspect, the oscillating mechanisms disclosed herein provide an eccentric pin which is angled to the same angle as a fork to align the bearing with the arms of the fork and reduce sliding and impact and therefore wear and damage between the bearing and the fork while increasing contact area between the bearing and the fork. In another aspect, the oscillating mechanisms disclosed herein provide a hollow cylinder provided within the arms of the fork and configured to accept the bearing therein to reduce sliding and impact and therefore wear and damage between the bearing and the fork while increasing contact area between the bearing and the fork.

Figure 11:
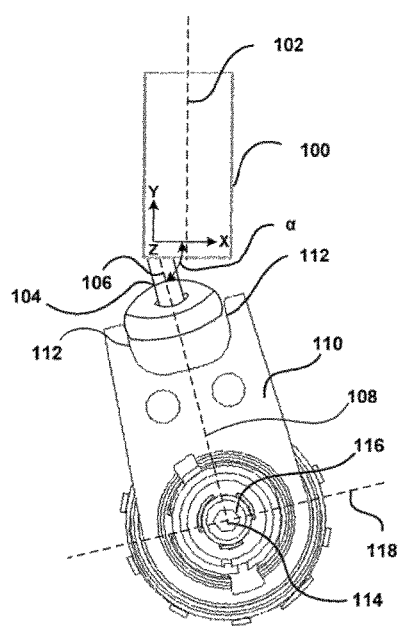
FIG. 11 is a top view illustrating one example of how the eccentric pin maintains the same angle with the fork starting in a leftmost position.
Figure 12:
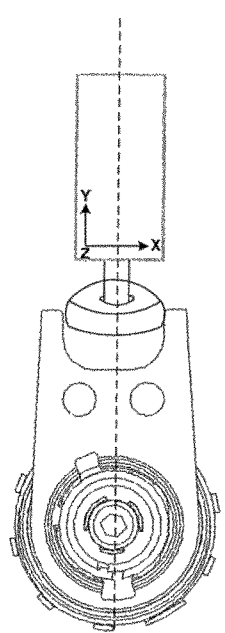
FIG. 12 is a top view depicting the result of movement of the mechanism of FIG. 11 to a top dead center or bottom dead center position depending on the direction of rotation of the motor.
Figure 13:
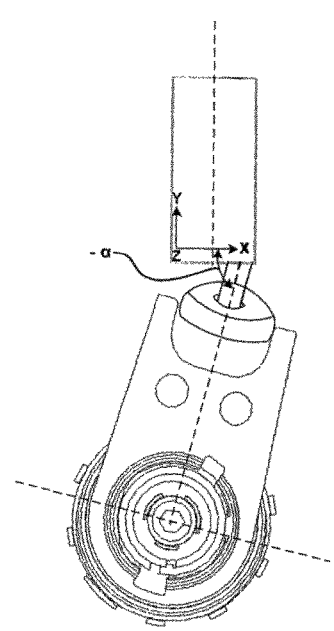
FIG. 13 shows the result of movement of the mechanism of FIG. 11 until it has reached a rightmost position as the motor rotates.

Turning now to FIGS. 11, 12 and 13, an example of how the eccentric pin maintains it angular orientation to the fork is illustrated. Starting with FIG. 12, a motor 100 can be seen that includes or defines a drive axis 102 or motor axis about which it rotates. A drive shaft (not shown) is coupled to the motor and has an eccentric pin 104 attached to it. In this embodiment, the motor and the drive shaft share a common axis of rotation but it is contemplated that this may not be true for other embodiments. The attachment of the eccentric pin, as the name implies, locates the pin 104 a predetermined distance away from the drive axis 102 of the motor. In some embodiments, the pin is integral with the shaft of the motor while in other embodiments the pin is a separate member that is fastened to the drive shaft. Any form of attachment is contemplated that is sufficiently secure and robust. The eccentric pin defines a direction 106 along which the pin extends, and in this case, is the cylindrical axis of the pin. This axis is substantially coextensive with axis 108 defined by the fork member 110 and which is centered between and equidistant from the inner surfaces 112 of the arms of the fork member. As such, this fork axis 108 may also be called the fork angle and may be defined by the arms of the fork in the X-Y plane or other plane of desired oscillation.

Both the direction 106 along which the pin 104 extends and the axis defined by the fork member 110 are substantially aligned with the axis of rotation 114 of the output spindle 116 (also referred to herein as the axis of rotation of the fork mechanism), which is in the plane of desired oscillation (for instance the X-Y plane as shown in FIGS. 11 thru 13). For this embodiment, the common axis 102 of the drive shaft and motor is substantially aligned with the axis of rotation 114 of the output spindle 116, which is the same as the axis of rotation of the fork mechanism. Although not shown here, the fork member may be pivotally coupled to the output spindle along axis 118 (see FIG. 8). The axis 102 of rotation of the drive shaft coupled to the motor, the axis 114 of rotation of the output spindle, and pivoting axis 118 of the fork mechanism are all oblique to each other and may be perpendicular in some embodiments.

Focusing still on FIG. 11, Cartesian coordinates are provided. The eccentric pin 104 is fixedly attached to the drive shaft so that it forms a fix angle with respect to the drive shaft or axis of rotation 102 of the motor. As can be imagined, the angle of the pin will change with respect to the X-Y and Y-Z plane as the drive shaft or motor rotates but does not change with respect to the drive shaft. As shown in FIG. 11, the eccentric pin is solely in the X-Y plane meaning it forms an angle α with the X axis or plane that is perpendicular to the axis of the motor. This angle is the complement angle to the desired maximum angle of oscillation on either side of the axis of rotation of the motor. As shown in FIG. 11, angle α is completely in X-Y plane, meaning it has no component in the Y-Z plane or X-Z plane. Since the axis 102 of rotation of the motor is perpendicular to the X-Z plane, there is never any component of angle α that is ever in the X-Z plane.

However, as the motor, drive shaft and eccentric pin rotate about axis 102 from the position shown in FIG. 11, angle α develops a growing component in the Y-plane while the corresponding X-Y component decreases. Eventually, the eccentric pin will reach a top dead center or bottom dead center position as depicted by FIG. 12 depending on the direction of rotation, at which time angle α is completely in the Y-Z plane and cannot be seen from a top view like FIG. 12. Since during this process the direction 106 that the eccentric pin 104 extends and the axis 108 defined by the fork member 110 remains substantially coextensive and substantially aligned with the axis 114 of rotation of the output spindle 116, the angle of the fork and eccentric pin remain substantially the same as the mechanism works.

From FIG. 12, the motor, drive shaft and eccentric pin will continue to rotate until the eccentric pin is once more completely in the X-Y plane as illustrated by FIG. 13. At this time, the angle α is opposite that of FIG. 11 but of the same value. The process then reverses itself and then repeats over and over, creating the oscillating movement that is desired. It is contemplated that the attachment of the eccentric pin could be achieved in other ways and still maintain the angle of the pin to be the same as the angle of the fork and these methods are to be considered within the scope of the disclosure.

In another aspect, the oscillating mechanisms disclosed herein provide a pivot between the fork and an output spindle coupled to the working tool or blade. The pivot transfers the interface of movement from between the fork and the bearing to between the bearing and the output spindle to eliminate sliding and impact and therefore wear and damage between the bearing and the fork. Any embodiment discussed herein includes applications where a power tool includes an oscillating tool or when a power tool uses an oscillating eccentric mechanism that is configured to rotate in one direction and a fork mechanism that rotates in another direction.

For any method or protocol discussed herein, any step may be omitted, substituted by other steps, broken into sub-steps or performed in an order that is different than has been specifically mentioned or may be performed simultaneously. Also, additional steps may be added as desired.

The specific embodiments described above have been shown by way of example, and it should be understood that these embodiments may be susceptible to various modifications and alternative forms. For example, the above disclosed embodiments and other features, functions, aspects, or alternatives thereof, may be desirably combined into many other different systems, applications or methods. Various presently unforeseen or unanticipated alternatives, modifications variations or improvements may be subsequently made by those skilled in the art that are also intended to be encompassed by the present disclosure. Furthermore, other features and aspects, etc. of certain embodiments may be substituted for or added to other features and aspects, etc. of other embodiments to produce yet further embodiments and are therefore contemplated to be within the scope of the present disclosure. It should be therefore understood that the claims are not intended to be limited to the particular forms disclosed, but rather to cover all modifications, equivalents, and alternatives falling with the sprit and scope of this disclosure.

What is claimed is:

1. A power tool comprising:
    a motor including a drive shaft that is rotatable about a central longitudinal axis of the drive shaft;
    an eccentric pin attached to the drive shaft such that (a) an angle between a central longitudinal axis of the eccentric pin and the central longitudinal axis of the drive shaft is oblique and (b) the rotation of the drive shaft causes rotation of the eccentric pin about the central longitudinal axis of the drive shaft;
    a bearing attached to the eccentric pin; and
    a fork that includes arms and in which the bearing is arranged such that the rotation of the eccentric pin about the central longitudinal axis of the drive shaft causes the fork to rotate about an axis that is non-parallel to the central longitudinal axis of the drive shaft, wherein the eccentric pin and the fork are arranged relative to each other such that an angle of between (a) the central longitudinal axis of the eccentric pin and (b) a central longitudinal axis of the fork remains fixed throughout the rotations of the eccentric pin and of the fork; wherein at least one of: the fork includes a fork member that includes a hollow tubular structure; and the power tool further comprises an output spindle (a) that includes a pivot connection that includes at least one axle that protrudes outwardly from the output spindle, and (b) to which the fork is rotatably connected for rotation of the fork about a fork rotation axis that is perpendicular (1) to the central longitudinal axis of the drive shaft and (2) to the axis that is non-parallel to the central longitudinal axis of the drive shaft.

2. The power tool of claim 1, wherein the bearing is cylindrical and contacts the arms of the fork.

3. The power tool of claim 1, wherein the power tool is an oscillating tool.

4. The power tool of claim 1, wherein the axis about which the fork is rotated by the rotation of the eccentric pin is perpendicular to the central longitudinal axis of the drive shaft.

5. The power tool of claim 1, wherein the eccentric pin is integral with the drive shaft.

6. The power tool of claim 1, wherein the central longitudinal axis of the eccentric pin is substantially aligned with the central longitudinal axis of the fork.

7. The power tool of claim 1, wherein the central longitudinal axis of the eccentric pin forms an oblique angle, with a plane that is perpendicular to the central longitudinal axis of the drive shaft, that is a compliment angle to a maximum angle of oscillation on each side of the central longitudinal axis of the drive shaft.

8. The power tool of claim 1, further comprising a housing wherein the motor, the eccentric pin, the bearing, and the fork are disposed in the housing.

9. A power tool comprising:
a motor including a drive shaft that is rotatable about a central longitudinal axis of the drive shaft;
an eccentric pin attached to the drive shaft such that (a) an angle between a central longitudinal axis of the eccentric pin and the central longitudinal axis of the drive shaft is oblique and (b) the rotation of the drive shaft causes rotation of the eccentric pin about the central longitudinal axis of the drive shaft;
a bearing attached to the eccentric pin;
a fork that includes arms and in which the bearing is arranged such that the rotation of the eccentric pin about the central longitudinal axis of the drive shaft causes the fork to rotate about a first fork rotation axis that is perpendicular to the central longitudinal axis of the drive shaft; and
an output spindle to which the fork is rotatably connected for rotation of the fork about a second fork rotation axis that is perpendicular to the first fork rotation axis and that is perpendicular to the central longitudinal axis of the drive shaft; wherein at least one of: the fork includes a fork member that includes a hollow tubular structure; and the output spindle includes a pivot connection that includes at least one axle that protrudes outwardly from the output spindle.

10. The power tool of claim 9, wherein the fork includes the fork member that includes the hollow tubular structure.

11. The power tool of claim 10, wherein the bearing is complimentary shaped to the hollow tubular structure of the fork and is pressed therein.

12. The power tool of claim 10, wherein the hollow tubular structure includes a cylindrical shape.

13. The power tool of claim 9, wherein the eccentric pin and the fork are arranged relative to each other such that an angle between the central longitudinal axis of the eccentric pin and a central longitudinal axis of the fork remains fixed throughout the rotations of the eccentric pin and of the fork.

14. The power tool of claim 9, wherein the output spindle includes the pivot connection that includes the at least one axle that protrudes outwardly from the output spindle.

15. The power tool of claim 14, wherein the at least one axle includes two axles that protrude in diametrically opposite directions from the output spindle.

16. The power tool of claim 14, wherein the fork includes at least one receiving member that is configured to receive the at least one axle of the output spindle.

17. The power tool of claim 10, wherein the bearing is spherical and is configured to freely move within the hollow tubular structure.

18. The power tool of claim 17, wherein the eccentric pin and the fork are arranged relative to each other such that an angle between the central longitudinal axis of the eccentric pin and a central longitudinal axis of the fork remains fixed throughout the rotations of the eccentric pin and of the fork.

19. The power tool of claim 1, wherein the fork includes the fork member that includes the hollow tubular structure.

20. The power tool of claim 1, wherein the power tool further comprises the output spindle (a) that includes the pivot connection that includes the at least one axle that protrudes outwardly from the output spindle, and (b) to which the fork is rotatably connected for rotation of the fork about the fork rotation axis that is perpendicular (1) to the central longitudinal axis of the drive shaft and (2) to the axis that is non-parallel to the central longitudinal axis of the drive shaft.

* * * * *